Jan. 13, 1953

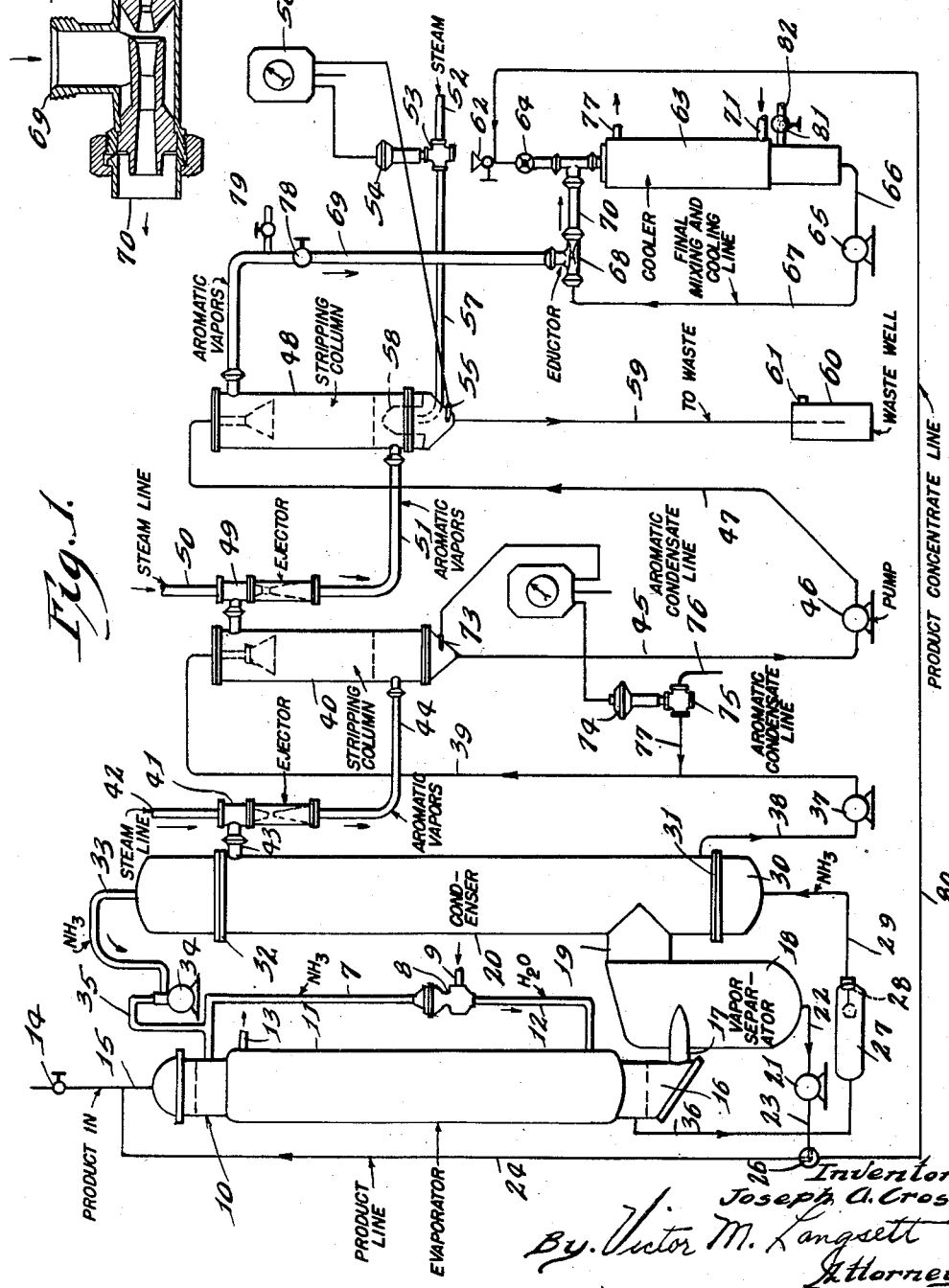

J. A. CROSS 2,625,505

METHOD AND APPARATUS FOR RECOVERING
VOLATILE FLAVORING MATERIAL

Filed June 9, 1950

Inventor.
Joseph A. Cross.
By Victor M. Langsett
Attorney.

Patented Jan. 13, 1953

2,625,505

UNITED STATES PATENT OFFICE 2,625,505

METHOD AND APPARATUS FOR RECOVERING VOLATILE FLAVORING MATERIAL

Joseph A. Cross, Westerville, Ohio, assignor to Mojonnier Bros. Co. Inc., Chicago, Ill., a corporation of Illinois Application June 9, 1950, Serial No. 167,119

11 Claims. (Cl. 202—52)

This invention relates broadly to the separation and recovery from aqueous solutions of volatile fractions other than water vapor.

The invention is not limited to the treatment of any particular products but is widely applicable to products having volatile fractions which become vaporized when subjected to heat and which may advantageously be recovered for restoration to some or all of the original product or recovered for other uses.

A particular use of this invention relates to methods and apparatus for concentrating aromatic liquids and for salvaging the volatile and aromatic flavoring elements thereof.

The concentration of aromatic liquids, for example those of the class of fruit juices, which serve as a good illustration, has long presented a number of difficult problems, in that certain evaporation practices used in the past, have tended to produce "cooked" flavors in such liquids and lose by evaporation the natural or original volatile flavors of such products. Various attempts have been made heretofore to solve these problems but the results of such efforts have usually been unsatisfactory.

The invention is also useful for the separation and recovery of volatiles in the nature of solvents which boil at temperatures different than the boiling temperature of liquids admixed therewith.

The invention described herein provides improved concentration methods and apparatus and contemplates considerable flexibility in the treatment of the liquids, depending upon the particular results desired. For example, if it be desired to avoid heated flavors one may conduct the evaporation of the liquid at temperatures low enough to avoid imparting cooked flavors and the invention readily lends itself to such an objective.

On the other hand, if the avoidance of cooked flavors is not important, this invention may be performed utilizing higher evaporation temperatures.

Another feature of the invention which affords a great advantage is that during the separation of the aromatics, if any substantial alcohol content also be evaporated and collected along with the aromatics, the manner in which the invention is practiced lends itself readily to the production of an aromatics concentrate, whose alcohol content, due to absorption in a greater quantity of product concentrate, is not so high as to subject the process to the strict controls and regulations which are prescribed by the Federal Government. The terms "aromatics" and "essences" as used herein include all volatiles exclusive of the water vapor and more particularly, the specific volatile constituents of the product, usually associated with its flavor or distinctive aroma, which vaporize more readily than the main body of the product.

Numerous advantages, objects, and novel features of the invention will be particularly mentioned or will become apparent from a perusal of the following specification.

In the specification I have shown and described how my invention may be utilized advantageously both in batch processing and also in continuous processing, both of which processes have their own proper and necessary respective places in industry.

In the drawing:

Fig. 1 is a diagrammatic portrayal of the apparatus utilized preferably for a batch operation.

Fig. 2 is a diagrammatic lay-out of the apparatus used preferably for a continuous process embodying my invention.

Fig. 3 is a cross-sectional detail of the eductor used both in the batch or the continuous processing apparatus.

In Fig. 1 there is shown an evaporator generally indicated as 10, this evaporator being preferably of the vertical tubular type, having a surrounding water jacket 11 through which cooling water preferably is circulated, entering through the pipe 12 and emerging from the pipe 13 for the purpose of removing excess heat from the heating medium, such as a refrigerant fluid, which is circulated through the evaporator 10 and the adjoining condenser, later to be described, this excess heat being normally the heat of compression of the refrigerant. For this purpose a pipe 7 communicating with the compressed refrigerant (later described) will control a diaphragm type pressure controlled valve 8 which will so regulate the flow of water from pipe 9 through the valve into pipe 12 and thence through the jacket as to maintain the pressure of the compressed refrigerant within a desired uniform operating range. That is, if the pressure tends to climb more cooling water circulating through the jacket will take off and waste more heat being carried by the refrigerant and thus restore its pressure to within the desired range.

The aromatic liquid to be evaporated is introduced through valve 14 and pipe 15 into the space at the top of the evaporator above the upper tube sheet, and the liquid is allowed to flow downwardly through the insides of the tubes, emerging with the vapor into the vapor space 16, below the lower tube sheet.

The liquid and vapor then flow through the pipe 17 into a centrifugal vapor separator 18, wherein the vapor is centrifugally separated and from which the vapor flows through pipe 19 into a condenser 20.

A pump 21 continuously withdraws the separated liquid from the bottom of the separator through pipe 22 and delivers it through pipes 23 and 24 back again to the top of the evaporator to enter the pipe 15.

During the foregoing described recirculation the two-way valve 26 will be positioned so as to cause the liquid flowing from pipe 23 to be diverted into pipe 24.

When the invention is being practiced so as to have the benefit of low temperature evaporation I prefer to use as a heating medium a refrigerant, and for purposes of illustration will state that ammonia ($NH_3$) may be utilized as the refrigerant, and will be circulated in the following manner.

A body of liquid refrigerant is accumulated in the high pressure side of the refrigeration system in a liquid receiver 27, and under control of a float controlled valve 28 is admitted into the line 29 from which it flows into a space 30 below the tube sheet 31 in the vertical tubular condenser 20. The liquid refrigerant flows upwardly through the insides of the tubes at a suction pressure enabling it to evaporate at a temperature lower than that of the vapors being admitted into the space surrounding the tubes from the duct 19. The latent heat exchange in condenser 20 will effect condensation of the product vapor, or the majority of it, and the evaporation of the refrigerant. Vaporized refrigerant emerging above the upper tube sheet 32 is withdrawn through the pipe 33 by a refrigerant compressor 34 and compressed for example to 225 lbs. pressure, at which pressure its saturation temperature would be about 108 degrees F. The compressed refrigerant enters by pipe 35 the chest space surrounding the tubes in the evaporator 10 and serves as the heating medium for evaporating the aromatic liquid flowing downwardly through the tubes of that evaporator. The latent heat supplied by the refrigerant gas to the liquid product serves simultaneously to evaporate aromatic essences and the aqueous vapor at about 60° F. from the liquid product and simultaneously to condense the refrigerant at about 108° F. The condensed refrigerant is withdrawn from the bottom of the heating medium space surrounding the tubes through the pipe 36 and is returned to the receiver 27, for recirculation again through the condenser 20, compressor 34 and the evaporator 10.

The aromatic essences or aromatics, which are important to be salvaged, together with any alcohols which may be evaporated from the liquid, all evaporate along with some of the water in the evaporator 10 and are delivered by the vapor separator 18 into the condenser 20. It has been found, for example, that if about ten to fifteen per cent of the original liquid volume of such juices as apple juice and grape juice be evaporated and condensed in the condenser 20 the vapors will contain practically all of the recoverable aromatics. The percentage evaporated in evaporator 10 depends upon the pressures, temperature differentials, the amount of heat transfer surface and flow rates, all of which factors are readily understood by those skilled in the evaporation art, hence here require no detailed instructions.

The $NH_3$ liquid rising upwardly through the condenser 20 will be vaporized at a temperature of about 45 degrees F., the water vapor condensing on the outside of the tubes of the condenser at about 60 degrees F. The major portion of the aromatic essences are condensed, along with the water vapor, in the condenser 20 and are withdrawn therefrom by means of the pump 37 and pipe 38 and delivered through the pipe 39 into the top of a stripping column 40.

For evacuating the non-condensible gases and those aromatics which were not condensed in the condenser 20 I employ a steam jet ejector 41 supplied with steam from the pipe 42 which serves to evacuate through the pipe 43 these non-condensible gases and uncondensed aromatics and to deliver them through the pipe 44 into the bottom of the stripping column 40.

For the purpose of increasing the surface areas within the stripping column I prefer to use Raschig rings to pack the column. The steam heated vapors delivered by the ejector 41 serve to heat to about 120° F. the condensate falling through the stripping column 40 and will strip therefrom a large proportion of the aromatics.

The unvaporized liquids falling from the stripping column 40 will emerge therefrom through the pipe 45 and will be delivered by the pump 46 and pipe 47 into the top of the second stripping column 48.

In the meantime a second steam ejector 49, being supplied with steam through the pipe 50, will eject into the pipe 51 the aromatics and non-condensible gases rising to the top of the stripping column 40 and deliver them into the bottom of the second stripping column 48.

The steam utilized in the second ejector 49 will heat the vapors ejected thereby and heat the condensate in the second stripping column and assist in stripping therefrom substantially all of the remaining aromatics which are carried in the liquid delivered by the pipe 47.

In order to assist in attaining and maintaining a temperature range of about 180° F. to 205° F. in the stripping column 48 I prefer to supply under thermostatic control additional steam from the pipe 52 through the diaphragm control valve 53 whose diaphragm 54 is subject to the control of the thermostatic element 55 inserted as shown into the bottom portion of the stripping column 48. The gauge 56 will indicate the temperature existing at the point of the thermostatic element 55 and the steam supplied through pipes 57 will pass upwardly through the condensate falling past the baffle 58, further heating it and facilitating the stripping of aromatics therefrom.

The condensate falling to the bottom of the stripping column 48 is now freed substantially of all of the aromatic essences and will fall through the pipe 59, which may be a barometric leg terminating in the well 60, the overflow being allowed to go to waste through a pipe 61.

It will be recognized now that practically all of the aromatics which were desired to be recovered and salvaged are now rising through the stripping column 48. To collect these aromatics for commingling with the concentrate of the product being processed, I employ a closed cycle recirculation system including an eductor and an absorber.

To make this equipment available and effective at the initiation of the process I prefer to introduce, prior to starting the operation, through an inlet funnel 62 a small quantity of liquid, such as concentrate from a previous run, or some of the original strength product liquid or any other liquid which may be properly mixed with the aromatics which are to be collected. This small quantity, perhaps one-fifth or less of the maximum capacity of the eductor recirculating system, will be dropped into the cooler 63 and the valve 64 will thereafter have to be closed. The pump 65 will be started up and enough liquid will be available so that the pump will be continuously primed and will deliver a solid stream of liquid from the bottom of the cooler 63 through the pipe 66, thence upwardly through the pipe 67 and through the eductor 68, which is shown in some detail in Fig. 3. The aspirating effect or Venturi effect of this stream of liquid will cause the aromatic gases emerging from the top of the stripping column 48 to be drawn by suction through the pipe 69 and commingled with the solid stream of liquid from the pipe 67 into the discharge pipe 70 which leads into the top of the cooler 63. I have found it advantageous to use a pump which will deliver liquid at about one hundred pounds pressure to the eductor.

Some cooling medium, for example a refrigerant or some other appropriate cooling medium, is constantly recirculated through the cooler 63 in heat exchange with the aromatics by means of the pipes 71 and 72 to cause the aromatics which are drawn into the cooler by means of the eductor to be fully condensed, after which they may continue to recirculate with the liquid through the pump 65 and back again to the cooler. By using a refrigerant as the cooling medium and an ordinary tube chest as the cooler 63 the liquid passing therethrough is readily cooled to close to 32° F. This not only aids in condensing the aromatics but increases the suction effect in the eductor where some water vapor is immediately condensed by such low temperature liquid.

In the operation of the ejector 41 a considerable quantity of steam is used to contribute to the vacuum desired in the condenser 20 and to provide heat for the stripping action in the first stripping column 40. However, as a precautionary measure and to prevent the temperature of the liquid in the first stripping column from rising too high, I prefer to insert a thermostatic element 73 into the bottom of the first stripping column, and utilize it to control the diaphragm 74 of the diaphragm controlled valve 75 which, under this thermostatic control, will admit water from a supply pipe 76 and through a delivery pipe 77 into the condensate rising through the pipe 39, thus to assure that the temperature in the first stripping column does not rise higher than roughly in the neighborhood of 120° to 130° F. The temperature range maintained in the first stripping column need not be narrow but requires some control so that the two stripping columns and their associated ejectors may work in series in a proper manner to eject and to strip.

It has been pointed out heretofore that the equipment illustrated schematically in Fig. 1 is intended for batch operation, that is, the treatment of a batch of a given size of liquid, in contrast to continuous operation.

In the use of the apparatus shown in Fig. 1 the aromatics condenser just described and shown in the right side of Fig. 1 is first primed as explained and placed in a continuous recirculating operation. The steam ejectors and the refrigerant compressor are started. A small quantity of the raw liquid product to be concentrated and to have its aromatics salvaged is introduced through the valve 14 into the evaporator 11, and all pumps are started. There may be some initial foaming in the evaporator 11 and when this has ceased, the remainder of the batch may then be introduced through the valve 14 into the evaporator 11 after which the valve 14 may be closed. The entire system will then begin to operate as heretofore explained.

During the initial stages of evaporation of the liquid product being recirculated by means of the pump 21 through the evaporator 11, most of the aromatics will be evaporated and separated along with water vapor and delivered into the condenser 20. Even after the aromatics have thus been separated, it is of course necessary that the evaporator 11 continue to operate in order that the balance of the liquid product may be concentrated down to some desired density. While this is being accomplished, some additional aromatics may be withdrawn, and in any event the condenser 20 will operate as explained, the ejectors and associated stripping columns will function as heretofore described, and the aromatic essences stripped will be delivered through pipe 69 by means of the eductor 68 into the cooler 63 and finally concentrated in the recirculating path which runs through the cooler 63 and the eductor 68.

When it is determined that no more aromatics are being extracted from the liquid product during the final stages of evaporation thereof, the valve 78 in the line 69 may be closed and the valve 79 may be opened allowing the steam and other vapors from the second stripping column to be discharged to atmosphere.

In the meantime the concentrate will continue to recirculate and remain cool.

The schematic lay-out shows a convenient means for mixing product concentrate with the essence concentrate which is being recirculated through the cooler 63. When it is determined that the batch has been sufficiently concentrated in the evaporator 11 the two-way valve 26 may be rotated to cause the output of the pump 21 to be delivered into the pipe 80, and, upon opening of the valve 64, this concentrate can be commingled with the concentrated essence circulating through the cooler 63, and the concentrated liquid with the concentrated essences restored thereto may then be evacuated through valve 81 and pipe 82 to storage or to any canning or bottling equipment which may be utilized.

In practice the valve 81 should be left constantly open slightly to bleed off non-condensible gases which otherwise might accumulate in the absorber system.

Fig. 2 illustrates schematically the manner of using the invention in a continuous process in which the raw product or juice may be continuously introduced into the system and a concentrated product with the aromatics restored thereto continuously discharged from the system. To facilitate an understanding of the system, as shown in Fig. 2, pipes shown as single lines represent pipes carrying liquids, while pipes shown in double lines represent pipes carrying gases or vapors.

The same stripping columns shown in Fig. 1 are also shown in Fig. 2 and each are designated with the letter S, while condensers are each marked with the letter C and evaporators with the letter E. For the purpose of obtaining efficient operation it is preferred that the continuous system employ a series of evaporators as I find this more efficient than to endeavor to do all of the evaporating to a desired concentration in a single evaporator.

Referring further to Fig. 2 the liquid product to be treated is introduced continuously through a pipe 101 at the top of the first tubular evaporator 102. This evaporator is provided with a cooling jacket 103 through which cooling water is circulated for the purpose of taking off the excess heat of compression generated in the compression of the refrigerant, which is used as the heating medium for all of the three evaporators, to maintain the refrigerant cycle in equilibrium. The pressure operated valve 103′, similar in function to valve 8 (Fig. 1) will regulate the cooling function of jacket 103.

The liquid product falling through the vertical tubular evaporator 102 is subjected to partial evaporation sufficient to evaporate a considerable proportion of the water vapor and substantially all of the aromatics. The vapors and the unvaporized liquid will fall through the bottom of the first evaporator 102 into the centrifugal separator 104 from which the water vapors, containing the aromatics, will be delivered through pipe 105 into the condenser 106.

Liquid refrigerant is supplied by pipe 107 to the insides of the tubes in the condenser 106 for condensing the mixed aqueous and aromatic vapors. This heat exchange causes vaporization of the refrigerant, the refrigerant gas then emerging through pipe 108 for delivery to the compressor 109.

Pump 110 delivers the condensate from condenser 106 to the top of stripping column 111. The steam ejector 112 is supplied with steam from pipe 113, and the non-condensible gases and uncondensed aromatics from condenser 106 are delivered thereby to the bottom of the stripping column 111, these gases passing upwardly through the condensate in a countercurrent manner and stripping a large portion of additional aromatics therefrom.

The liquid falling through the first stripping column 111 is delivered by pump 114 to the top of the second stripping column 115 while steam ejector 116, supplied with steam from pipe 117 ejects the non-condensible gases and a considerable portion of the aromatics from the first stripping column into the bottom of the second stripping column for upward passage therethrough in countercurrent flow through the downwardly falling liquid. In the second stripping column, as will be understood, the remainder of the aromatics are stripped from the liquid and the waste liquid product is delivered through a barometric leg 118 to waste.

An eductor 119, corresponding in function with the eductor 68, in conjunction with the recirculation pump 120, will aspirate the aromatics from the top of the second stripping column and commingle them with the body of liquid being recirculated through the cooler 121.

A thermostatic element 122 is employed to control, through the thermostatically operated valve 123, the addition of such water as may be needed through the pipe 124 to maintain a desired temperature condition in the first stripping column.

Also the thermostatic element 125 controlling the thermostatically operated valve 126 will regulatably supply steam through the pipe 127 for furnishing additional heat in the second stripping column to maintain a temperature range therein of between 180 degrees F. up to about 205 degrees F. contributing to the efficiency of a stripping action and supplementing proper functioning of the eductor 119.

Turning now to the matter of continuing the concentration of the liquid initially introduced into the first evaporator 102, the vaporized liquid dropping to the bottom of the first centrifugal separator 104 is withdrawn therefrom by means of the pump 128 and delivered into the top of the second tubular evaporator 129. The vapor and unvaporized liquid descending through the evaporator 129 emerges into the centrifugal separator 130 and the separated vapors therefrom are delivered into the condenser 131, wherein the water vapor is condensed and from which it is evacuated by pump 132 to waste.

The unvaporized liquid collected in the separator 130 is delivered by pump 133 into the top of the third tubular evaporator 134. The vapor and liquid product emerging from the bottom of the tubes in evaporator 134 flow into the centrifugal vapor separator 135, and the separated vapors therefrom are delivered through duct 136 into the condenser 137 where these aqueous vapors are condensed and from which they are evacuated by means of the pump 138 to waste.

The unvaporized liquid collecting in the bottom of the vapor separator 135 will have attained the desired final concentration for the product and may be evacuated therefrom by means of pump 139 and delivered through pipe 140 and valve 141 into the top of the aromatics cooler 121 for commingling with the condensed aromatics and noncondensibles, which are being constantly collected and recirculated through that cooler by means of the pump 120 and the eductor 119. Thus it may be seen that with the equipment schematically illustrated in Fig. 2 the original liquid product may be continuously evaporated to a desired concentration, the aromatics are continuously separated therefrom and progressively stripped and concentrated in the cooler 121 and there commingled again with the concentrated product delivered through the pipe 140. Pipe 142 is provided for the continuous discharge of the commingled concentrated product to use or storage and affords an outlet for the continuous release of non-condensed gases or vapors.

Condensers 131 and 137 are shown equipped with steam ejectors 143 and 144 which serve to evacuate to waste non-condensible gas such as air which otherwise might accumulate in these condensers.

It may be noted, without further explanation, that compressor 109 supplies compressed refrigerant gas as the heating medium to each evaporator, from which the condensed refrigerant flows to the receiver 145. The float controlled pressure reducing valve 146 permits flow of the condensed refrigerant to each of the condensers 106, 131 and 137. When ammonia is used as the refrigerant it may be compressed to 225 lbs. pressure and will condense in the evaporators at about 108° F. and be reevaporated in the condensers at about 45° to 50° F. Under normal operation the product evaporates in the evaporators at 60° to 70° F. and the water vapor will be condensed at substantially the same temperatures in the condensers.

The foregoing temperatures and pressures are suitable for low temperature evaporation when it is desired to avoid subjecting the product to high temperatures which might destroy certain vitamins and flavors.

Higher evaporation temperatures may be employed, however, if desired and the same apparatus used therefor, utilizing other refrigerants and/or other controls to maintain the desired operating conditions.

It will now be apparent that if high evaporator temperatures are desired steam may be used as the heating medium, instead of compressed refrigerant gas, and the condensing may be accomplished by refrigerants or other cooling means.

It will be noted that evaporation in all instances is conducted under sub-atmospheric pressures, and the stripping columns are also operated under sub-atmospheric pressures.

While I have shown two stripping columns in each of Figs. 1 and 2, it may be stated that whenever adequate stripping may be obtained through the use of one column, the first column may be eliminated, in which event ejector 49 would be connected to condenser 20 in Fig. 1 and ejector 116 would be connected to condenser 105 in Fig. 2. The use of two stripping columns and their associated ejectors facilitate the attainment of a high vacuum effect and higher efficiency, but in some instances a commercially adequate amount of aromatics can be recovered by the use of one stripping column, one steam ejector and the eductor.

If the process and apparatus be employed to recover a solvent, the solvent may be collected in part in the condenser and in part absorbed in a liquid consisting of previously liquefied solvent recirculated through the absorber consisting of the cooler 63 or 121 and their associated pumps and eductors.

It should further be understood that the invention is susceptible of some variation and modification and is not limited to the precise details of the methods and apparatus herein set forth.

Having shown and described my invention, I claim:

1. A method of separating and recovering specific volatile constituents from an aqueous solution thereof comprising evaporating from the solution a quantity of vapor containing substantially all of said volatile constituents admixed with aqueous vapor produced by such evaporation, segregating said vapor mixture and immediately condensing the greater portion thereof, thereafter withdrawing the uncondensed vapors and non-condensible gases by means of a steam ejector and utilizing the output of that ejector for stripping said volatile constituents from said condensed vapors, and collecting the stripped volatile constituents together with said non-condensible gases and absorbing them into a relatively small quantity of cooled liquid by direct admixture therewith while in the gaseous state.

2. A method of separating and recovering specific volatile constituents from an aqueous solution thereof comprising evaporating from the solution a quantity of vapor containing substantially all of said volatile constituents admixed with aqueous vapor produced by such evaporation, segregating said vapor mixture and immediately condensing the greater portion thereof, elevating the temperature of the uncondensed vapors and non-condensible gases by admixture with steam and utilizing said heated product for stripping said volatile constituents from said condensed vapors, and collecting the stripped volatile constituents together with said non-condensible gases and absorbing them into a relatively small quantity of cooled liquid by direct admixture therewith while in the gaseous state.

3. A method of stripping and recovering specific volatile constituents from an aqueous solution thereof comprising evaporating from the solution a quantity of vapor containing substantially all of said volatile constituents combined with aqueous vapor and non-condensible gases, condensing in a condensing zone substantially all of said vapors, flowing the condensate downwardly through a stripping zone, steam ejecting the non-condensible and uncondensed volatile constituents from the top of the condensing zone and utilizing the thus heated vapors for stripping volatile constituents from the condensate in said stripping zone by counter-current passage therethrough, collecting and liquefying the stripped volatile constituents by recirculating a liquid through a cooled absorbing zone and by Venturi effect suction exerted by the circulating liquid drawing the volatile constituents released in the stripping zone into said liquid circuit and mixing them with the liquid for passage through said absorbing zone.

4. The method of concentrating a liquid containing volatile flavoring constituents and salvaging the volatile flavoring constituents thereof comprising subjecting the liquid to evaporation under vacuum, subjecting the vapor products of said evaporation to condensation in a condenser at a temperature below the condensation temperatures of the major portion of the volatile flavoring constituents contained in said vapor, flowing the condensate downwardly through a stripping column, withdrawing uncondensed volatile flavoring constituents and non-condensible gases from the vapor space in said condenser by means of a steam ejector and injecting the output of said ejector in countercurrent flow through said stripping column for stripping the volatile flavoring constituents from said condensate, and during the stripping of said volatile constituents from said condensate continuously recirculating a body of liquid through a cooled absorber and an eductor and utilizing the suction produced in the eductor for withdrawing the stripped volatile flavoring constituents from the stripping column and commingling them with the recirculating liquid for gradually increasing the concentration of volatile flavoring constituents in said liquid, separately concentrating the unvaporized liquid from said first evaporation to a desired concentration and adding thereto the concentrated volatile flavoring constituents contained in said recirculating liquid.

5. The method of separating and recovering specific volatile constituents from an aqueous solution thereof comprising subjecting the solution to evaporation at subatmospheric pressure sufficiently to separate the major portion of the said volatile constituents along with a quantity of the water vapor, subjecting the mixed water vapor and volatile constituents to condensation at such temperature that the major portion of the volatile constituents is condensed along with the water vapor, evacuating uncondensed volatile constituents and non-condensible gases by means of a steam ejector, utilizing the output of said ejector in a countercurrent flow for stripping volatile constituents from said condensate, and during the stripping of said volatile constituents from the condensate maintaining a body of liquid in closed cycle circulation through a cooled absorber and through an eductor and utilizing the suction created by the eductor for withdrawing the stripped volatile constituents under vacuum and mingling them with said recirculating liquid, separately evaporating to a desired concentration the unvaporized liquid from said first evaporation and discarding the vapor from said separate evaporation, and combining the concentrated liquid with said cooled liquid containing said stripped volatile constituents.

6. Apparatus for recovering specific volatile constituents comprising an evaporator and means for introducing a liquid possessing a distinctive aroma thereinto, a condenser and means connecting the evaporator and condenser for delivering vapor into the latter, stripping means and means for delivering vapor condensate thereinto from the condenser, steam ejector means connected for ejecting and delivering uncondensed volatile flavoring constituents and non-condensible gases from the condenser into the stripping means, and an absorber system including a cooler having cooling means, an eductor connected with the cooler and the stripping means for ejecting said volatile constituents and non-condensible gases therefrom, and a pump interconnected with the cooler and eductor by conduit means for recirculating liquid in a closed cycle from said cooler through the eductor and back to the cooler for aspirating the volatile constituents from the stripping means into said recirculating liquid.

7. A method of separating and recovering volatile constituents from an aqueous solution thereof comprising evaporating under vacuum from the solution a vapor mixture containing water vapor and vaporized volatile constituents, condensing the greater portion of the vapor mixture under vacuum in a condensing zone, flowing the condensed vapors from the condensing zone and stripping volatile constituents from the condensate by evacuating the uncondensed vapors and gases from the condensing zone by means of a steam ejector and flowing the heated output of the ejector through the withdrawn condensate under vacuum, pumping a stream of liquid containing previously condensed volatile constituents in a closed cycle through a cooling zone and an eductor and by the suction effect produced in the eductor evacuating the stripped volatile constituents and commingling them with said stream of liquid.

8. A method of separating and recovering distinctive aromatic volatile constituents from an aqueous solution thereof comprising evaporating under vacuum from the solution a quantity of vapor containing substantially all of the said volatile constituents admixed with aqueous vapor, segregating in a condensing zone under vacuum said vapor mixture and immediately condensing the greater portion thereof, withdrawing the uncondensed vapors and non-condensible gases from said zone by means of a steam ejector and utilizing the heated output of that ejector for stripping volatile constituents under vacuum from said condensed vapors in a stripping zone, and collecting the stripped volatile constituents under vacuum together with said non-condensible gases and absorbing them into a relatively small quantity of cooled liquid by direct admixture therewith while in the gaseous state.

9. Apparatus of the recovery of aromatic volatile constituents comprising an evaporator and means for introducing an aromatic liquid thereinto, means for effecting evaporation in the evaporator at sub-atmospheric temperatures and pressures, a condenser and means connecting the evaporator and condenser for delivering vapor into the latter, stripping means and means for delivering vapor condensate thereinto from the condenser, means supplying a cooling medium to the condenser at sub-atmospheric temperature, steam ejector means connected for ejecting and delivering uncondensed volatile constituents and non-condensible gases from the condenser into the stripping means, and an absorber system including a cooler having cooling means, an eductor connected with the cooler and the stripping means for ejecting volatile constituents and non-condensible gases therefrom, and a pump interconected by conduit means with the said cooler and eductor for recirculating liquid from the cooler through the eductor and back to the cooler imposing a vacuum on the stripping means and for aspirating into the liquid the gases from the stripping means and delivering them into the cooler.

10. Apparatus for the recovering of aromatic volatile constituents comprising an evaporator and means for introducing an aromatic liquid thereinto, a condenser and means connecting the evaporator and condenser for delivering vapor into the latter, stripping means and means for delivering vapor condensate thereinto from the condenser, steam ejector means connected for ejecting and delivering uncondensed volatile constituents and non-condensible gases from the condenser into the stripping means, means for separately discharging stripped condensate, and an absorber system including a cooler having cooling means, an eductor connected with the cooler and the stripping means for ejecting volatile constituents and non-condensible gases therefrom, and a pump interconnected between said cooler and eductor for recirculating liquid from the cooler through the eductor and back to the cooler for aspirating the gases from the stripping means into the liquid and delivering them into the cooler.

11. The method of separating and recovering specific voltatile constituents from an aqueous solution thereof comprising subjecting the solution to evaporation at sub-atmospheric pressure sufficiently to separate the major portion of the said volatile constituents along with a quantity of the water vapor, subjecting the mixed water vapor and volatile constituents to condensation at such temperature that the major portion of the volatile constituents is condensed along with the water vapor, evacuating uncondensed volatile constituents and non-condensible gases by means of a steam ejector, utilizing the output of said ejector in a countercurrent flow for stripping volatile constituents from said condensate, and during the stripping of said volatile constituents from the condensate maintaining a body of liquid in closed cycle circulation through a cooled absorber and through an eductor and utilizing the suction created by the eductor for withdrawing the stripped volatile constituents under vacuum and mingling them with said recirculating liquid and venting any non-absorbed non-condensible gases collecting in said cycle circulation, separately evaporating to a desired concentration the unvaporized liquid from said first evaporation and discarding the vapor from said separate evaporation, and combining the concentrated liquid with said cooled liquid containing said stripped volatile constituents.

JOSEPH A. CROSS.

REFERENCES CITED

The following references are of record in the file of this patent:

UNITED STATES PATENTS

| Number | Name | Date |
| --- | --- | --- |
| 1,466,670 | Monti | Sept. 4, 1923 |
| 1,851,266 | Todd | Mar. 29, 1932 |
| 2,423,746 | Zahm | July 8, 1947 |
| 2,423,747 | Zahm | July 8, 1947 |
| 2,457,315 | Milleville | Dec. 28, 1948 |
| 2,461,694 | McCubbin | Feb. 15, 1949 |
| 2,479,745 | Hohmiller | Aug. 23, 1949 |
| 2,510,138 | Pulley et al. | June 6, 1950 |
| 2,513,813 | Milleville | July 4, 1950 |
| 2,534,341 | Cross | Dec. 19, 1950 |